G. W. GWINN.
MACHINE FOR APPLYING STAMPS, LABELS, OR SEALING STRIPS TO CONTAINERS.
APPLICATION FILED JULY 12, 1916.

1,343,264.

Patented June 15, 1920.
9 SHEETS—SHEET 1.

Inventor:
GEORGE W. GWINN
by Dodge and Sons,
Attorneys

G. W. GWINN.
MACHINE FOR APPLYING STAMPS, LABELS, OR SEALING STRIPS TO CONTAINERS.
APPLICATION FILED JULY 12, 1916.

1,343,264.

Patented June 15, 1920.
9 SHEETS—SHEET 3.

Inventor:
GEORGE W. GWINN
by Dodge and Sons,
Attorneys

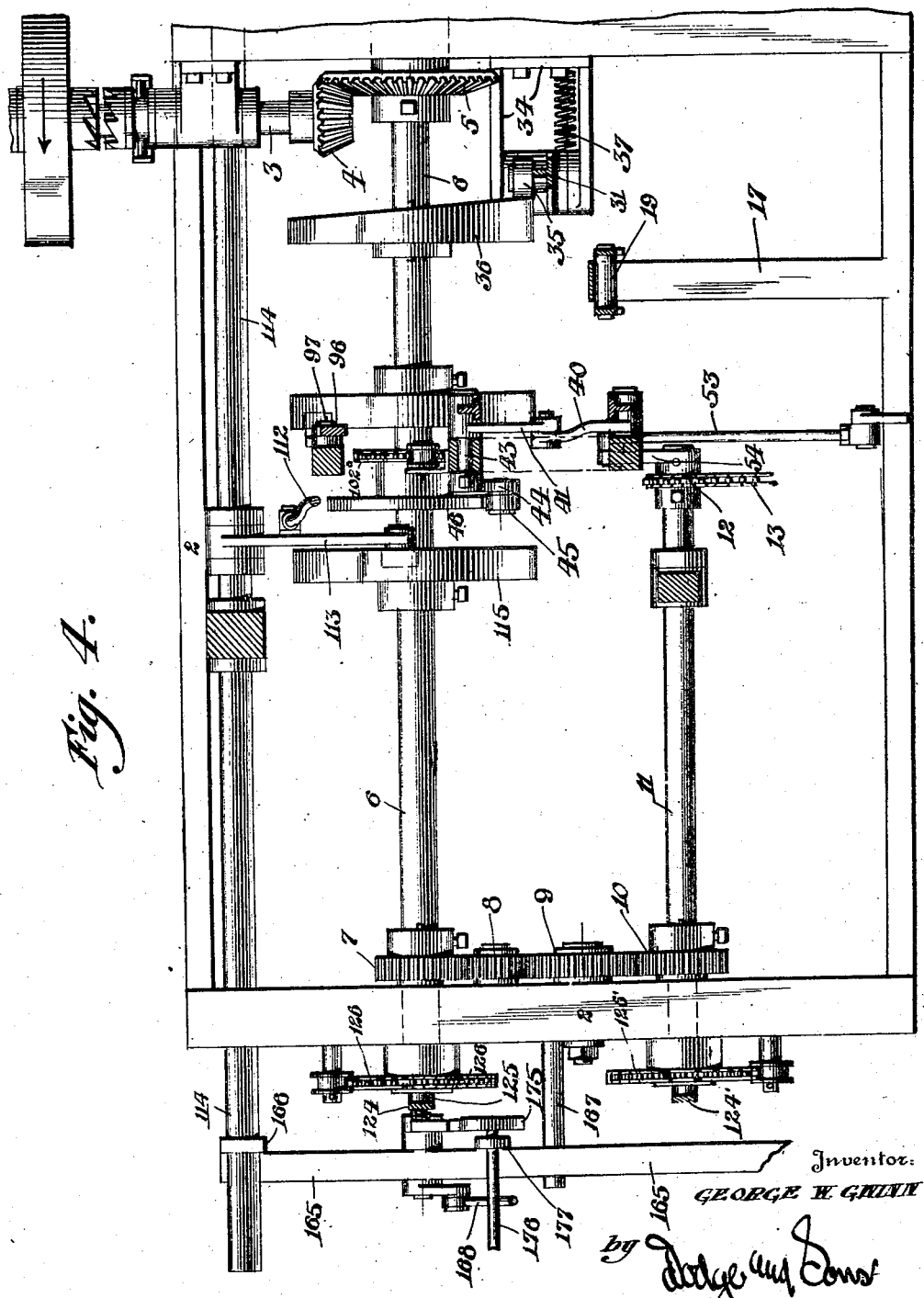

G. W. GWINN.
MACHINE FOR APPLYING STAMPS, LABELS, OR SEALING STRIPS TO CONTAINERS.
APPLICATION FILED JULY 12, 1916.
1,343,264.
Patented June 15, 1920.
9 SHEETS—SHEET 5.
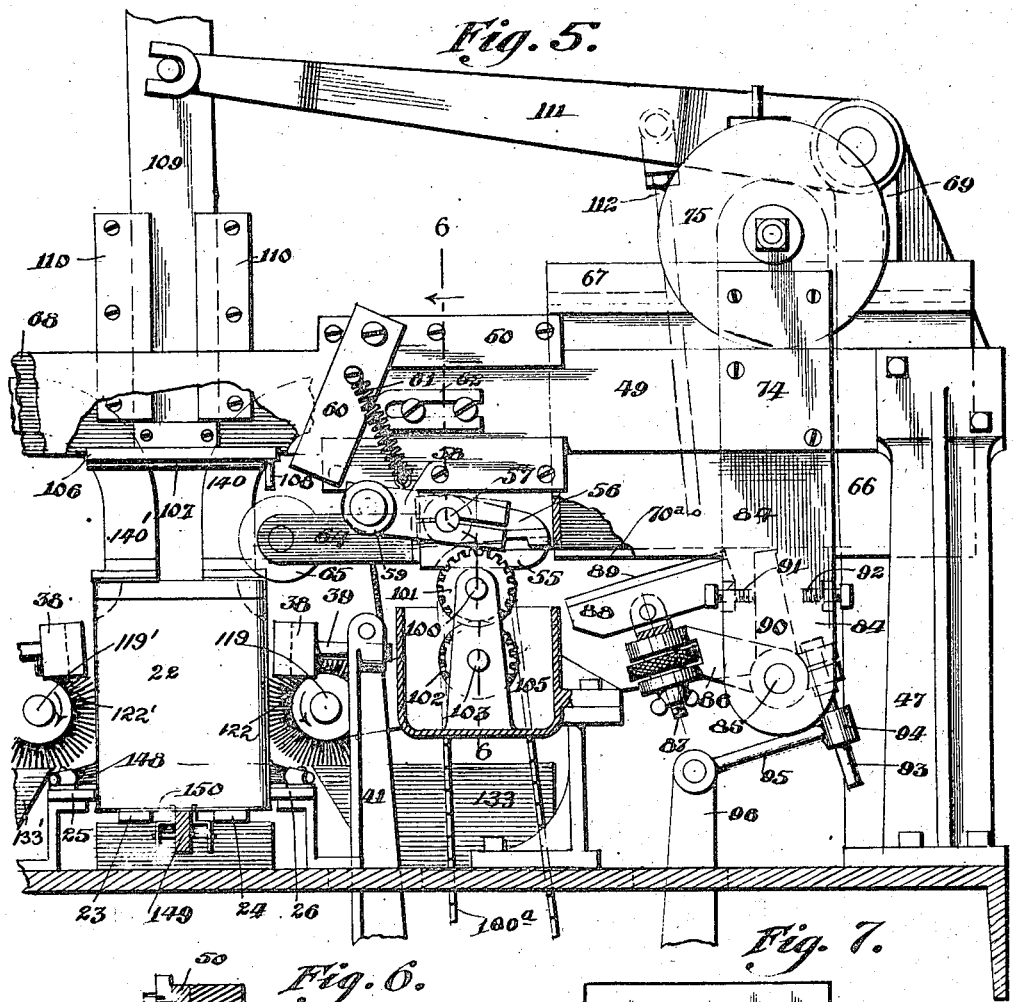

G. W. GWINN.
MACHINE FOR APPLYING STAMPS, LABELS, OR SEALING STRIPS TO CONTAINERS.
APPLICATION FILED JULY 12, 1916.

1,343,264. Patented June 15, 1920.
9 SHEETS—SHEET 6.

Inventor
GEORGE W. GWINN
By Dodge and Sons,
Attorneys

G. W. GWINN.
MACHINE FOR APPLYING STAMPS, LABELS, OR SEALING STRIPS TO CONTAINERS.
APPLICATION FILED JULY 12, 1916.
1,343,264.
Patented June 15, 1920.
9 SHEETS—SHEET 7.
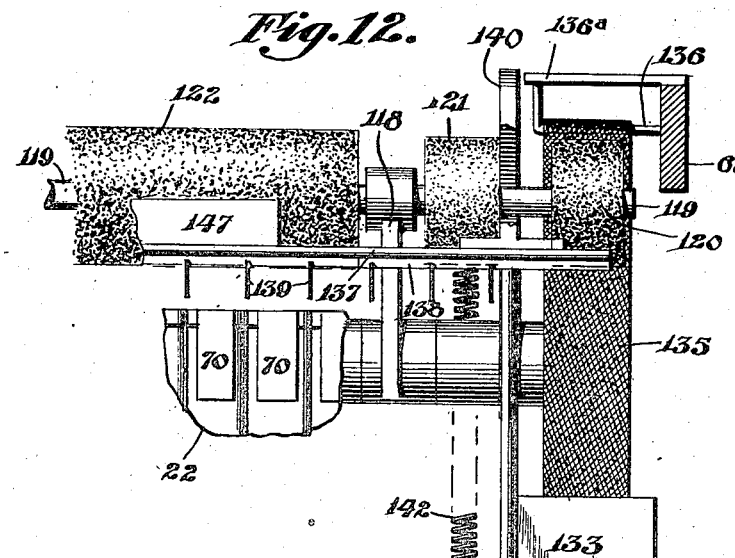
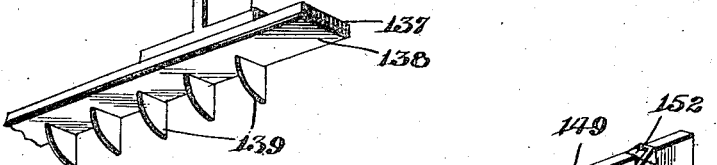
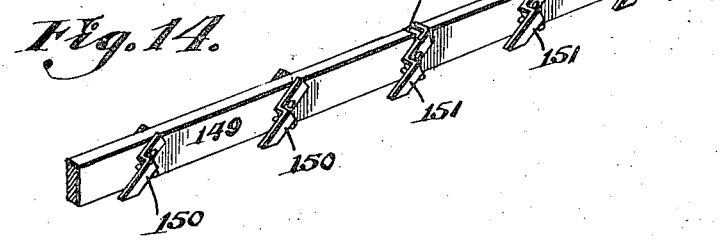
Inventor:
GEORGE W. GWINN
By Dodge and Sons,
Attorneys.

G. W. GWINN.
MACHINE FOR APPLYING STAMPS, LABELS, OR SEALING STRIPS TO CONTAINERS.
APPLICATION FILED JULY 12, 1916.

1,343,264.
Patented June 15, 1920.
9 SHEETS—SHEET 8.

Inventor
GEORGE W. GWINN

Attorneys

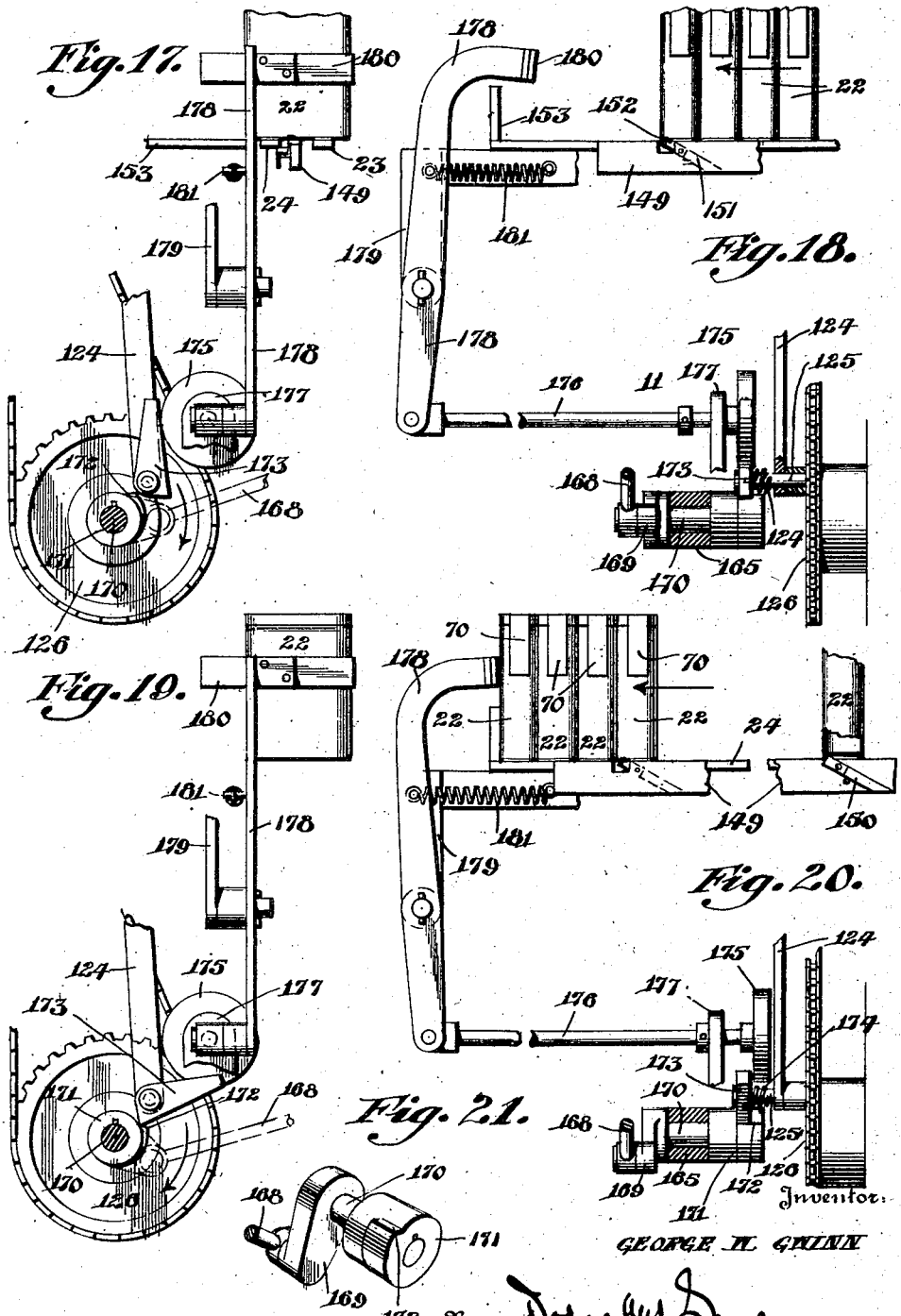

UNITED STATES PATENT OFFICE.

GEORGE W. GWINN, OF NEW YORK, N. Y.

MACHINE FOR APPLYING STAMPS, LABELS, OR SEALING-STRIPS TO CONTAINERS.

1,343,264.         Specification of Letters Patent.     Patented June 15, 1920.

Application filed July 12, 1916. Serial No. 108,917.

*To all whom it may concern:*

Be it known that I, GEORGE W. GWINN, a citizen of the United States, residing at New York, in the county of New York and State of New York, have invented a certain new and useful Improvement in Machines for Applying Stamps, Labels, or Sealing-Strips to Containers, of which the following is a specification.

Figure 1:
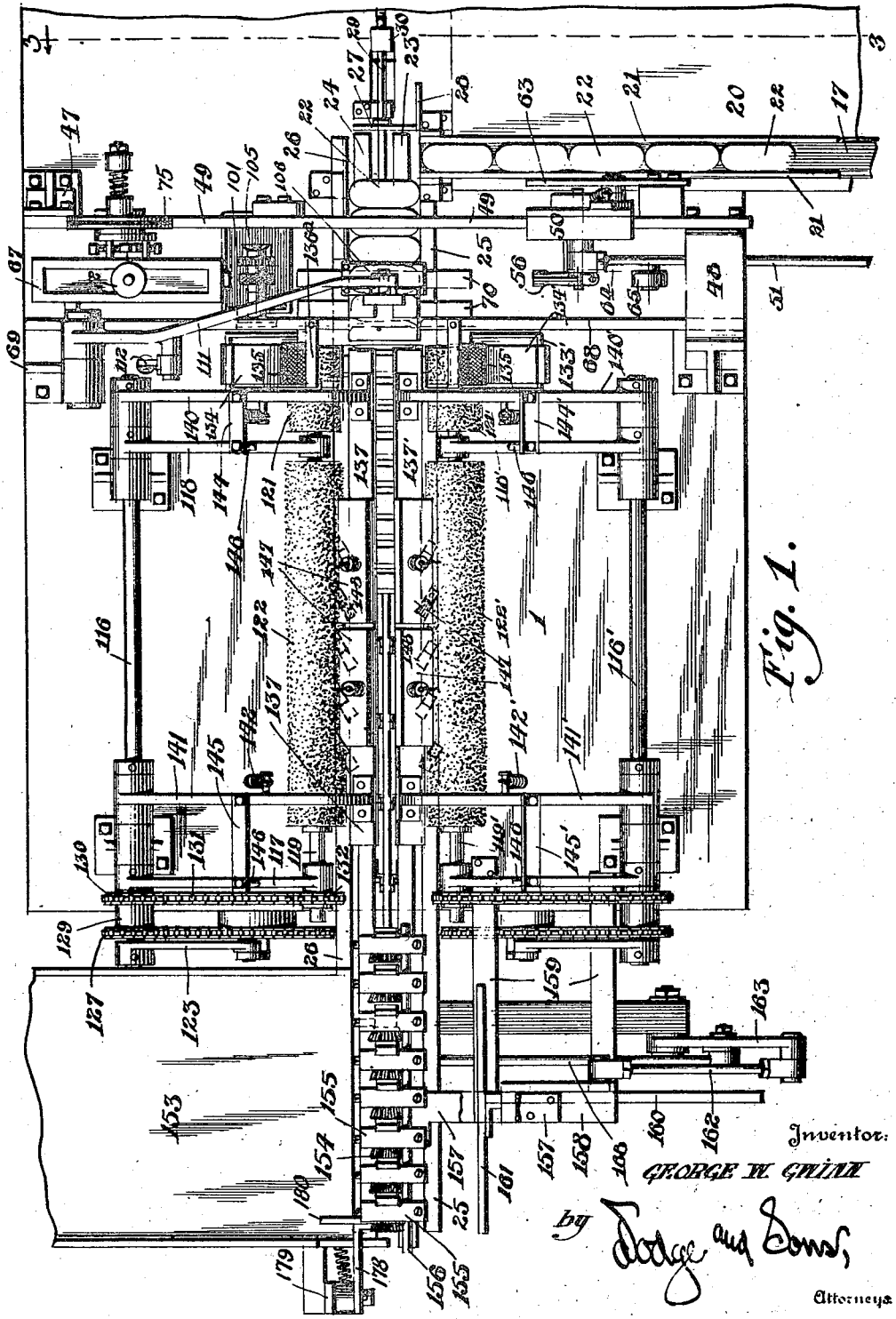
Figure 2:
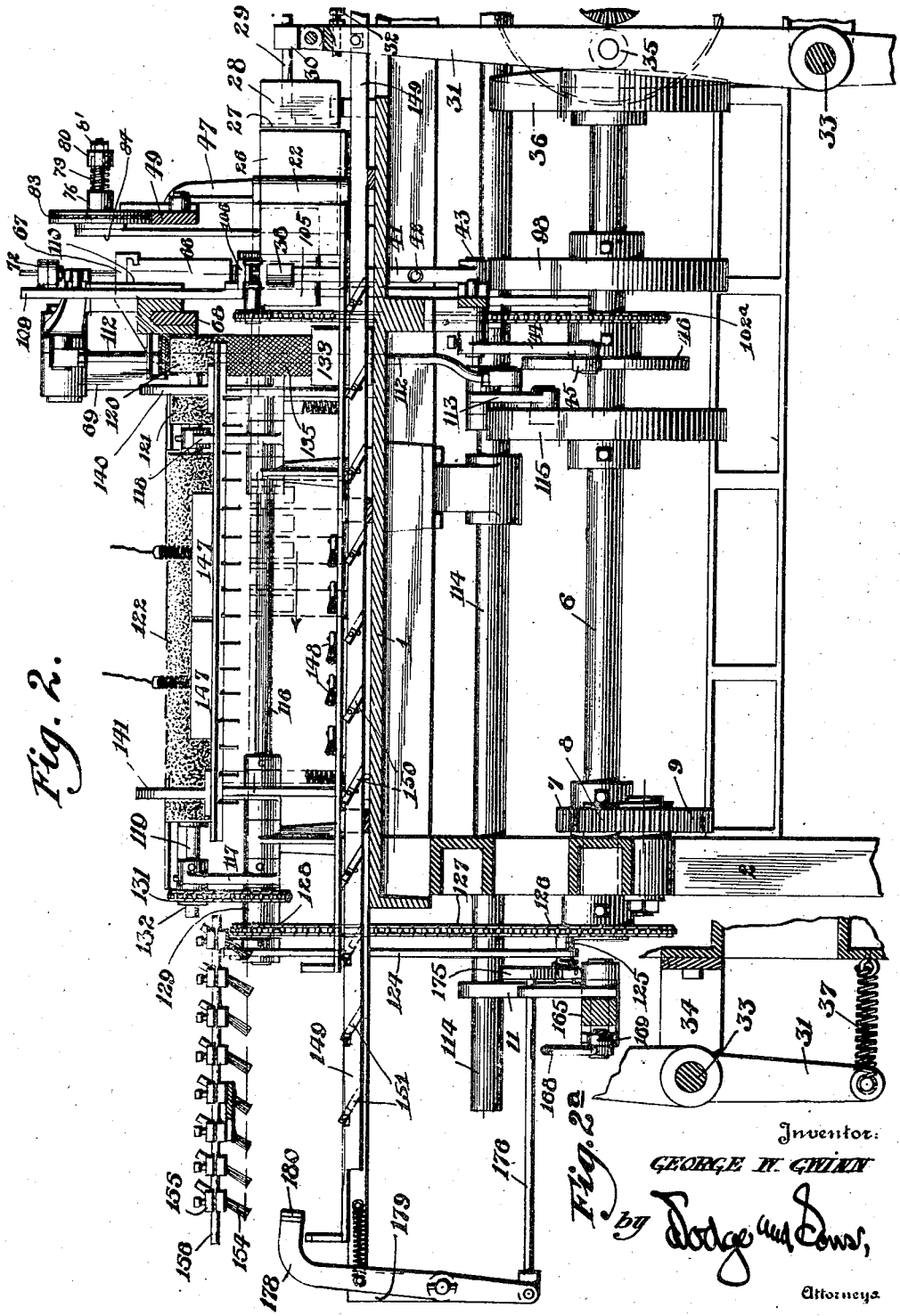
Figure 3:
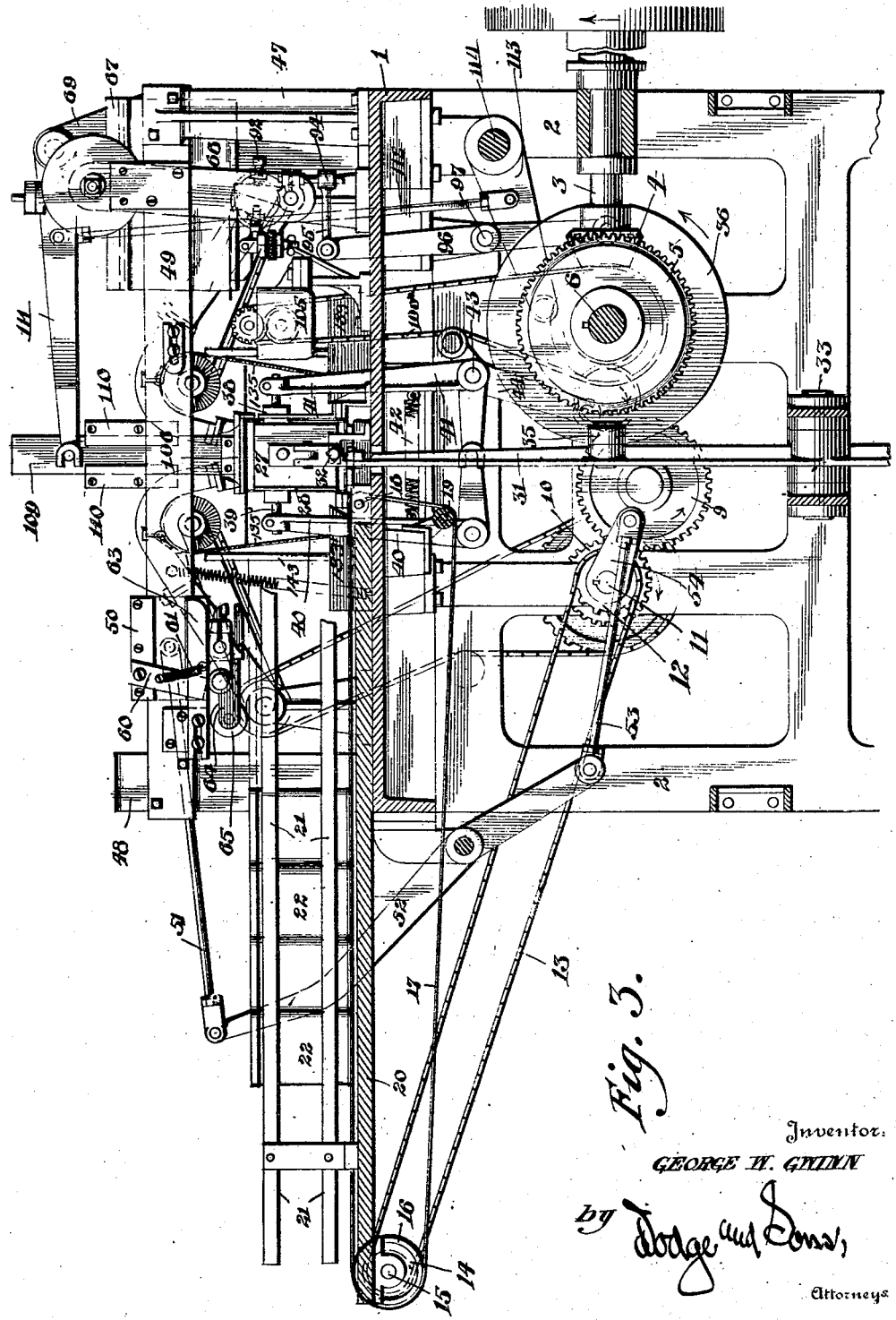
Figures 9, 10, 11:
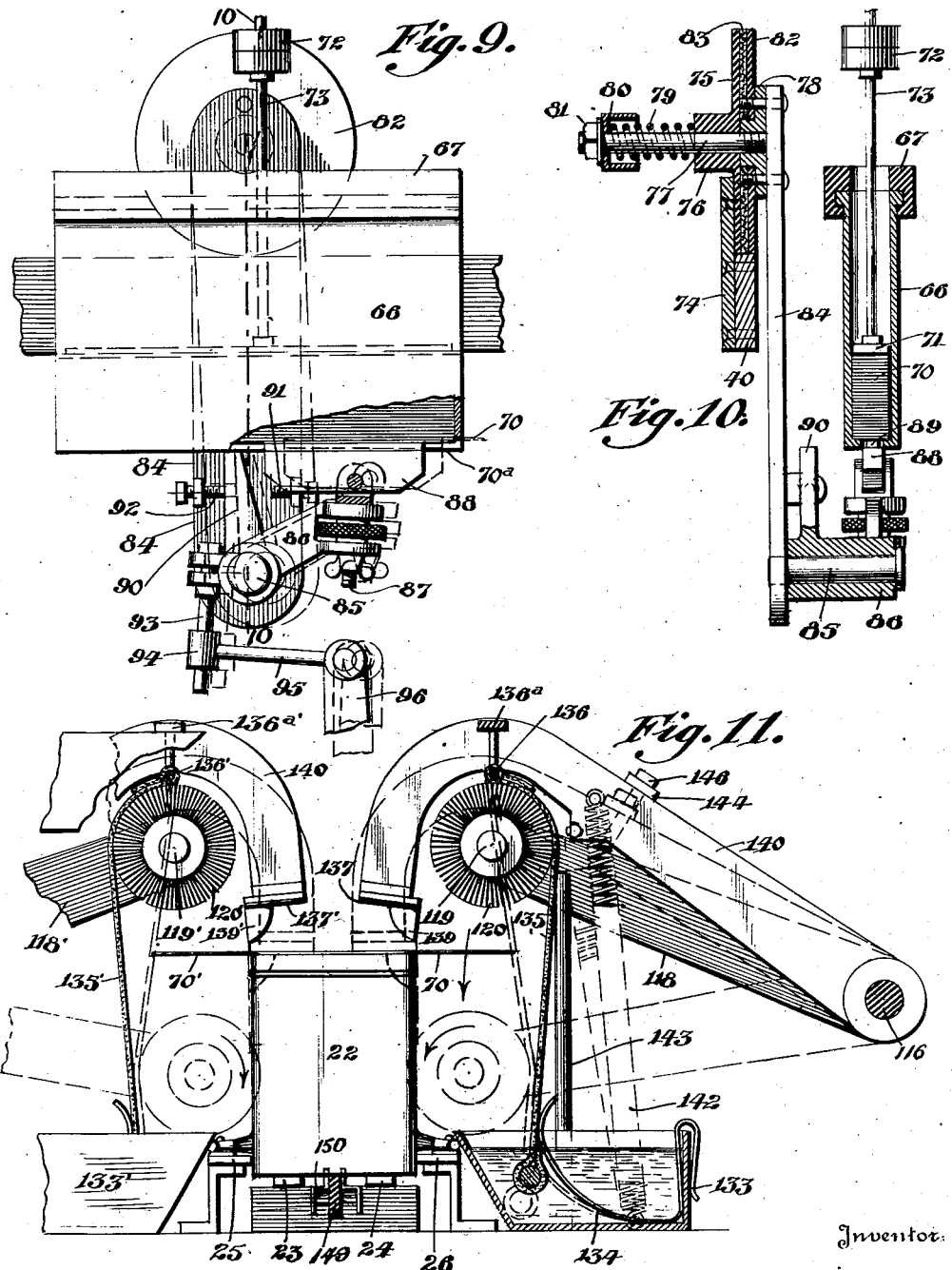
Figure 15:
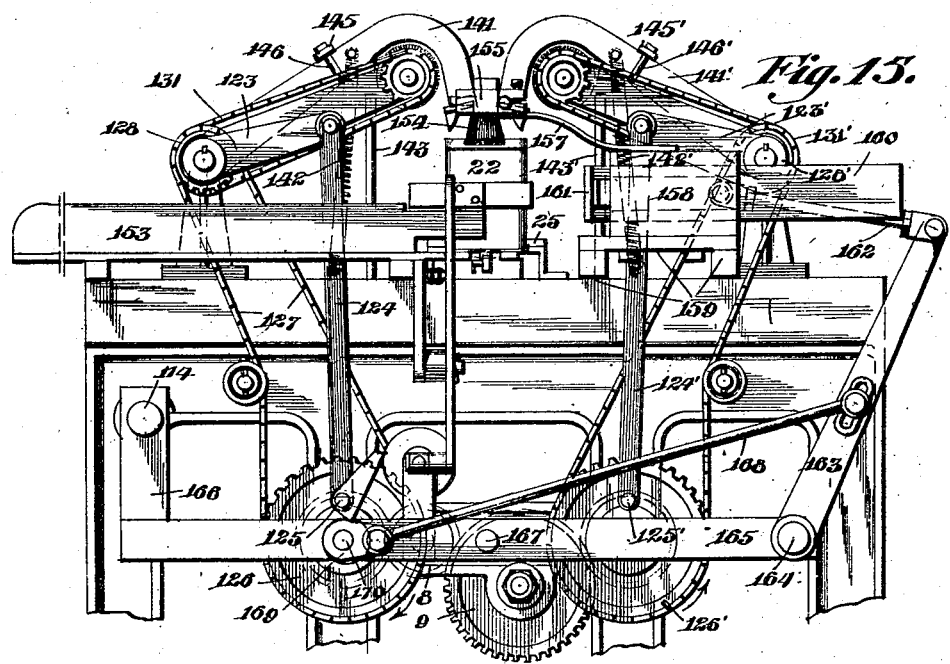
Figure 16:
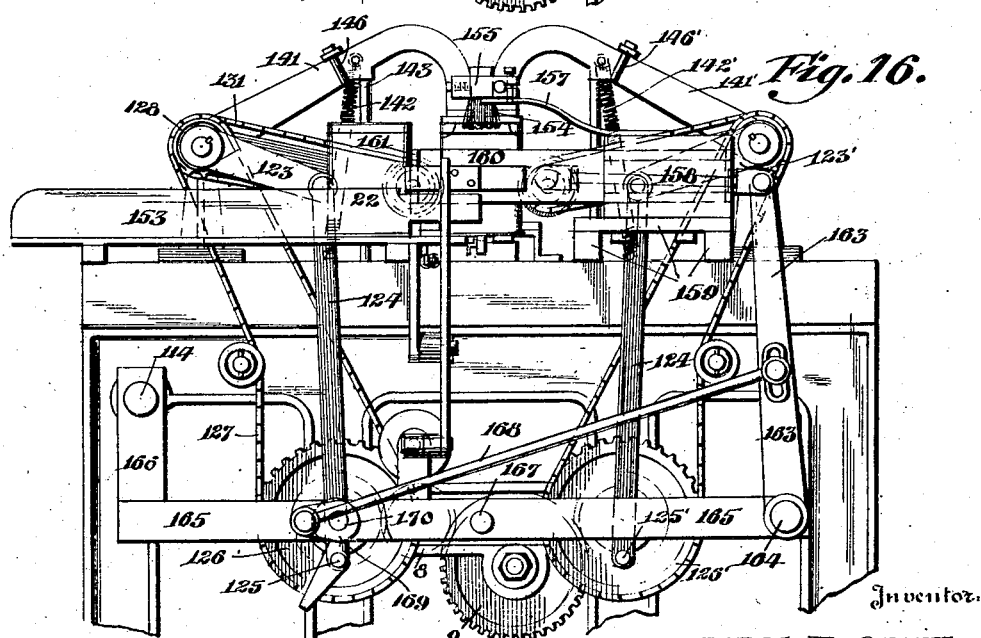

This invention pertains to an improved machine for applying stamps, labels or sealing strips to containers, the construction and advantages of which will be hereinafter set forth, reference being had to the annexed drawings, wherein:

Figure 1 is a top plan view of the machine;

Fig. 2 a longitudinal vertical sectional view thereof;

Fig. 2ᵃ a detail sectional view;

Fig. 3 a transverse vertical sectional view, on the line 3—3 of Fig. 1;

Fig. 4 a horizontal sectional view taken on a plane below the table, and illustrating the various driving and actuating elements;

Fig. 5 a sectional elevation of the forward portion of the machine on an enlarged scale;

Fig. 6 a sectional view, on the line 6—6 of Fig. 5, showing the paste receptacle and allied parts;

Fig. 7 an elevation of the stamp pincers and the lid-closing roller;

Fig. 8 a perspective view of the initial stamp presser;

Fig. 9 a sectional elevation of the stamp-box and the stamp-protruding mechanism;

Fig. 10 a vertical sectional view on the line 10—10 of Fig. 9;

Fig. 11 a sectional elevation of the initial stamp-wiping brushes, and the moistening means employed in conjunction therewith;

Fig. 12 a sectional elevation of one of the series of brushes employed to wipe the ends of the stamp or label against the sides of the container or can, and one of the secondary stamp-pressers;

Fig. 13 a perspective view of one of said stamp-pressers;

Fig. 14 a like view of the pawl-carrying bar employed to engage the lower portions of the cans to cause an even advancement of the cans through the runway;

Fig. 15 an end elevation of the machine;

Fig. 16 a like view showing the stamp-pressers as lowered and the wiping brushes in the lowermost position;

Figs. 17 to 20 inclusive, detail views of the means employed to throw the transfer mechanism for the cans or containers into operation; and Fig. 21 a detail perspective view of one of the clutch and actuating elements of said transfer mechanism.

While the machine is susceptible of being used for applying stamps, labels or sealing strips to various containers, it is especially adapted for applying revenue-stamps to tobacco tins or cans, which are now extensively employed in the tobacco-packing art. The terms "stamp" and "can" are hereinafter employed in a generic sense, except where such broad definition must, for obvious reasons, be excluded.

The main object of the invention is to produce a machine by which the stamps may be automatically presented to the cans in a pasted condition and be fully positioned thereon, the cans with the affixed stamps being discharged from the machine from time to time.

A further object of the invention is to so moisten the outer face of the ends of the stamp as to prevent them from curling up, thus facilitating the application of the stamp.

A still further object is to provide means which will so hold the stamp adjacent each end of the can-top as to prevent the stamp from being distorted or torn at such ends.

Another object is to provide means whereby the stamp-ends will be caused to fully conform and adhere to the curved sides of the can.

A further object resides in the provision of means whereby the stamps will be thoroughly dried before being discharged from the machine.

The invention has for a further object the provison of means whereby the cans are caused to maintain their proper position with reference to stamp-pressers and wiping means which act, respectively, on the body of the stamp upon the top of the lid and the ends of the stamp upon the sides of the can.

With these and other objects and advantages in view, as will hereinafter appear, a detail description of one embodiment of the invention will be given.

The bed or table 1 of the machine is mounted upon a suitable framing, designated generally by 2, which elements form the support for the bearings of the various operating shafts and actuating levers. The main driving shaft 3 (Fig. 4) carries a bevel gear 4, which meshes with a gear 5 secured adjacent one end of the main operating shaft, 6, which extends lengthwise of the machine. Said shaft has secured to it a gear 7 which meshes with an idler 8, said idler in turn meshing with an idler 9. Idler 9 meshes with a gear 10 secured upon a second operating shaft 11. Said shaft, adjacent its other end, carries a sprocket 12, about which passes a sprocket chain 13, the chain also passing, see Fig. 3, about a sprocket 14, secured upon a shaft 15. Shaft 15 also carries a belt wheel or pulley 16, a feed belt 17 passing about said pulley and about guide rollers 18 and 19. The belt, along its upper run, passes over a table extension 20, and in line therewith are upstanding guide-ways 21, the cans (designated by 22) being fed inwardly between the ways and discharged one by one onto a runway extending lengthwise of the machine, and along which the cans are progressively moved. Said runway will be formed according to the particular container to be stamped and in the present instance it comprises two bottom rails 23 and 24 (see Fig. 5) and two side bars 25 and 26. The cans, as they are fed inwardly by the belt 17 and pass onto the forward end of the runway, are moved lengthwise of the runway by a pusher plate or bunter 27, having a rearwardly-extending wing 28, which acts as a cut-off for the incoming cans as the bunter is moved inwardly and outwardly. The bunter (see Fig. 2) is carried by a rod 29, secured in the upper end of a block 30, mounted upon the upper end of a lever 31. An adjustable stop screw 32 serves to limit the inward movement of the lever, said screw taking against a fixed portion of the machine. Lever 31 is fulcrumed on a pin or bar 33, carried by a bracket 34, Figs. 2ª and 4, said lever carrying a roller 35 which coacts with a cam 36 secured upon shaft 6. A spring 37, secured to the lower end of the lever, holds the roller in contact with the cam 36.

The cans, as they are stacked up face to face on the runway, come into alinement with the stamp-presenter and initial stamp-presser. The particular can in line with the stamp-presenter is straightened up and held against any movement while the stamp is being drawn over the can top and pressed thereon. Said holding or clamping mechanism comprises a pair of oppositely-disposed blocks 38, the innermost vertical faces whereof are shaped to conform to the side or edges of the can, the blocks being mounted on pins 39 secured in the upper ends, respectively, of a pair of elbow levers 40 and 41. Said levers are pivotally supported in brackets extending downwardly from bed 1, and the inner lower ends overlap and are provided with a sliding pin connection. A spring 42, Fig. 3, tends to draw the upper ends of the levers inwardly and the blocks into contact with the cans. Shaft 43, see Fig. 4, upon one end of which lever 41 is secured, has mounted upon its opposite end an arm or lever 44, carrying at its lower end a roller 45, which coacts with a cam 46 secured upon shaft 6. The cam is so timed as to permit spring 42 to draw blocks 38 into clamping contact with the adjacent can when the cam comes to rest and just as the stamp is about to be drawn over the can top. The blocks bring the can to a true position with reference to the stamp and to the initial stamp-pressing device and securely hold the can while the stamp is being placed thereon.

The stamp-presenting mechanism may be of any approved type, and one form is illustrated in Figs. 1, 2, 3, 5, 6, 7 and 10. Secured to and extending upwardly from the bed 1 is a pair of standards 47 and 48, to which is secured a horizontally-disposed rail or bar 49. A pincer-carrying slide 50 is mounted on said rail, the slide being moved back and forth thereon through the medium of a link 51, pivotally secured to the upper end of a lever 52, Fig. 3, a link 53 pivoted to the lower end of the lever, and a crank 54 upon shaft 11. Slide 50 carries a lower, fixed, prong-shaped jaw 55, and an upper, coöperating, similarly shaped, pivoted jaw 56, the outer ends of the jaws standing in vertical alinement and adapted to grasp a stamp between them. Jaw 56 is mounted on the outer end of a rock shaft 57 journaled in slide 50, see Fig. 6, the opposite end of the shaft carrying an arm or lever 58, having a roller 59 mounted thereon. Pivotally attached at its upper end to the upper portion of slide 50 is a latch 60 (Fig. 5), and a spring 61, secured to said latch and the lever 58, tends to draw the latch inwardly over lever 58, and likewise tends to rock shaft 57 and cause jaw 56 to approach jaw 55. An adjustable stop 62, secured upon bar 49 acts when the slide comes into stamp-grasping position, Fig. 5, to swing the latch away from lever 58 and permit the spring to rock the lever and shaft 57, and consequently to throw jaw 56 toward jaw 55. A jaw-releasing member is arranged at the opposite end of rail 49, Fig. 3, said member having the form of bar 63, which stands in line with roller 59 and, as the slide nears its limit of motion to the left, comes into contact therewith, thereby depressing lever 58 and moving jaw 56 upwardly. The spring 61 will at such time swing the latch 60 in over the lever holding the jaws separated until the parts are again moved to the left and the latch coacts with the latch-releasing stop 62.

A horizontally-disposed, fixed arm 64, Figs. 1, 3 and 5, is secured to the lower portion of slide 50, said arm carrying a roller 65, which stands in line with that can which is held by the can-clamping blocks 38, the roller being at such height as to make a rolling contact with the can-top and insure the full closing of the top prior to the placement of the stamp thereon. This roller acts as the pincer is advanced toward the stamp box, and again as the slide is moved therefrom in the act of withdrawing and placing a stamp. The stamp box, designated by 66, is suspended from the under side of a bracket 67, Fig. 2, which latter is mounted on a cross bar 68 secured at one end to a standard 69 and at its other end to standard 48. The stamps, denoted by 70, are stacked within the box, see Fig. 10, and overlie a slot 70ª formed in the lower face of the box, the slot also extending through the lower portion of the front wall of the box to admit of the protrusion of the lowermost stamp therein so that it may be grasped by the pincers. A follower plate 71, Fig. 10, rests upon the uppermost stamp and is held down thereon by one or more weights 72, carried at the upper end of a rod 73, extending upwardly from the plate. The weights being removable, the pressure on the stamps may be regulated as required.

Secured to rail 49, see Figs. 5 and 10, is a plate 74, to which in turn is secured a second plate 75, provided with a laterally-extending hub 76. A rod 77 is journaled in the hub and one end thereof is threaded into a block 78, while the opposite end, which projects beyond the hub, is surrounded by a coiled spring 79, the spring at one end bearing against the hub while the opposite end bears against a cap or disk 80, held in place by a nut 81.

Block 78 has secured to the inner face thereof a disk-like member 82, provided with a friction face 83, of felt or the like, the spring 79 serving to draw said face into frictional, binding contact with the plate 75.

A depending arm or lever 84 is fixed to block 78, and pivotally supported at the lower end thereof on a stub axle 85 is a lever 86, the outer end of which is bifurcated and has adjustably mounted therein a stem 87. A push block 88 is pivotally mounted in the upper end of the stem, said block being provided upon its upper face with a strip 89 of rubber, felt or the like, adapted, under certain conditions, to pass through slot 70ª and to contact with the lowermost stamp. The hub of lever 86 has formed integral therewith a stop finger 90, lying between and adapted to coact with two oppositely-disposed stop screws 91 and 92, carried by arm 84. The rear portion of lever 86 has a stem or rod 93 secured therein, said stem extending downwardly and making a sliding fit within a head or enlargement 94, formed on one end of a link 95, the opposite end being pivotally secured to the upper end of a lever 96, fulcrumed at 97, Fig. 3. The lower end of said lever is provided with a roller which coacts with a cam 98 mounted on shaft 6, Figs. 3 and 4. This stamp-pusher or presenting mechanism is in the position shown in Fig. 5, after it has completed its stamp-protruding operation. After the stamp has been fully withdrawn by the pincers, the protruder comes to the position shown in full lines, Fig. 9, through a partial movement of lever 96 (toward the left in Fig. 5, or toward the right in Fig. 9), the mechanism being viewed from opposite sides in these figures. This partial movement swings lever 86 and carries the friction face of the push block 88 upwardly into contact with the lowermost stamp. A further movement of lever 96 then causes the block to advance outwardly in a right line, arm 84 at such time swinging on its fulcrum or rod 77, whereby the lowermost stamp 70 will be protruded, as indicated in Fig. 9. Upon a reverse movement of lever 96, from the right-hand dotted line position Fig. 9, to the full-line position, lever 86 will be rocked on its pivot and block 88 will be drawn downwardly away from the stamp-box, the friction element 83 at such time preventing arm 84 from swinging, while stop finger 90 comes into contact with stop screw 91. A further movement of lever 96 will then carry the arm 84 and the allied parts to their rearmost position, or that indicated in Fig. 5.

The stamps, as they are withdrawn by the pincers, are drawn across a paste-applying roller 99, Figs. 5 and 6, the bifurcated or separated ends of the fixed jaw 55 straddling the roller. Said roller is fixed upon a shaft 100, which likewise carries a gear 101, which meshes with a similar gear 102. Gear 102 is mounted on a shaft 103, which carries a paste-feeding roller 104, located in the lower portion of a paste-pot or receptacle 105. Motion is imparted to this pasting mechanism by a sprocket-chain 100ª, which passes about a sprocket-wheel 101ª, secured to shaft 100, and also about a sprocket-wheel 102ª secured to the main driving shaft 6. As the stamp is withdrawn by the pincers it has applied to its under face a centrally-located stripe of paste, and is carried over the can top, the time of release of the pincers being such, through the action of cam or bar 63, that the stamp comes to rest upon the can top with the ends of the stamp protruding outwardly equally to each side of the can. Roller 65, as before mentioned, positively closes the can top or lid as it moves forwardly and backwardly thereover prior to the placement of the stamp. The initial stamp-presser then comes into action to cause the adhesion of the stamp to the top of the can lid. Said presser comprises a plate 106, see more particularly Figs. 5 and 8, having a yielding face 107 of rubber or the like, and preferably provided with two downwardly-extending guide fingers 108, the adjacent faces of which are spaced apart the width of the stamp, or slightly in excess thereof. Plate 106 is attached to the lower end of a vertically-disposed sliding bar 109, mounted in suitable guides 110 supported on cross-bar 68, Fig. 2, vertical movement being imparted to said bar through a lever 111 fulcrumed on standard 69. Said lever is actuated through a draw bar or rod 112 which passes through an opening formed in the table and is connected to a lever 113, Figs. 2, 3 and 4, fulcrumed on a bar 114. The opposite end of the lever carries a roller which coacts with a cam 115 on shaft 6. The parts are so timed that as the pincers have passed the can in the act of drawing a stamp thereover the slide 109 descends and brings the fingers 108 to position on each side of the stamp, so as to prevent the stamp from flipping or turning sidewise, as its free end might do after it is withdrawn from the stamp box and passes free of the paste-applying roller 104. The presser fully descends when the stamp is fully positioned and causes a firm adherence between the stamp and the underlying can top. During this applying operation the can is firmly held in position by the clamping and positioning members 38, which, after the stamp is initially positioned, are released and at the same time the initial presser ascends. Bunter 27 then advances the cans along the runway and the can with the stamp upon the top comes into line with the initial pair of brushes which dampen the outer face of the stamp ends and brush them down against the sides of the cans.

The brush arrangement is duplicated upon each side of the runway through which the cans are advanced, and but one set will be specifically described, the duplicated parts being similarly numbered, with a prime (') appended thereto.

Mounted in suitable bearings on the bed are shafts 116 and 116' and to these are secured a pair of arms 117 and 118 in the free ends of which is journaled a shaft 119. Said shaft has secured to it the initial brush 120 which is relatively softer and slightly smaller in diameter than the next brush 121, which is preferably somewhat stiffer. The lever being actuated by a pitman 124 connected thereto and to a wrist-pin 125, extending outwardly from a sprocket wheel 126 secured to shaft 6, the corresponding sprocket 126' being secured to shaft 11. The pitman 124 swings the brush-carrying frame (composed of arms 117 and 118 and shaft 119) up and down, and the brushes are constantly rotated by a sprocket chain 127, passing about wheel 126 and about a smaller sprocket 128, secured to a sleeve 129, which latter carries a sprocket 130; a sprocket chain 131 also passes about said sprocket and about a sprocket 132 secured upon the adjacent end of the brush-carrying shaft 119. The brushes are rotated inwardly and downwardly with reference to the cans and stamps, and are rotated at such speed that as they are raised from their lower position up along the can, as the brush-carrying frame is raised, they still continue to exert a downward brushing action against the stamp end. In other words, the speed of rotation is in excess of the rising and falling motion of the brushes; thus, no matter whether the brushes are rising or falling they are exerting a downward brushing action on the stamp ends and as a consequence the stamps are caused to closely and evenly hug the cans.

To prevent the stamps from curling up, owing to the paste being applied to one side only, I find it advantageous to moisten the outer surface of the stamp ends, and this preferably as they are initially brushed down against the can sides. This is accomplished by dampening the initial brushes 120 by the means best shown in Figs. 11 and 12. Located on each side of the runway is a pan or water reservoir 133, to which is secured a spring 134, the free end of the spring being slightly rounded and bearing against a band or strip of textile or other absorbent material, 135, the lower end of the band being weighted. Said band is carried upwardly over brush 120 and is secured at its upper end to a rod 136 secured to bar 68 and to an arm or bracket 136ᵃ extending outwardly from said bar. As will be seen upon reference to Fig. 11, the moistened band 135 is in constant contact with the brush, and the brush will be moistened thereby; consequently, the outer face of the stamp end will likewise be moistened by the brush as the stamp is carried downwardly by the brush, thereby doing away with any tendency to curl, and likewise facilitating the conformation of the stamp to the can. After the stamp is thus applied, the can is advanced along the runway one bar or presser plate for the stamps adjacent each end of the can top, which plates not only have the function of holding that portion of the stamp which lies upon the can top against possible displacement by the brushes, but also of serving to press the stamp firmly onto the can top. Said plates are denoted by 137 and 137', and as best shown in Fig. 13, the under face thereof is provided with a rubber or other slightly yielding facing 138. The bar or plate is likewise provided with a series of downwardly-extending fingers 139, spaced a can distance apart, the lower inner edges whereof are curved, said fingers passing in between the adjacent cans when the bars are lowered, and serving to steady and properly position the cans. Each bar or presser plate is secured to the outer ends of a pair of arms 140 and 141, which are swiveled upon shaft 116 (and 116'), the arms and plates being urged downwardly by springs 142. When the runway is filled, or partially so, with cans, the plates 137 come into contact with the can tops and further downward movement thereof is arrested, but in order to limit the descent of the plates when the runway is empty or only partially filled, stop rods 143 are provided, said rods extending upwardly from the table and terminating below arms 140 and 141. Laterally-projecting arms 144 and 145 are secured respectively to arms 140 and 141, and each arm 144 and 145 carries a screw 146, which screws overlie the arms 117 and 118 (and 117' and 118') of the brush-carrying frame, and as said frame is elevated the presser-plates are likewise elevated, such elevation of the plates beginning just after the brushes in their upward movement have cleared the cans and the stamps thereon.

Electric heaters, indicated by 147, may be secured to the presser-plates to dry the stamps.

Fingers 139, as above noted, tend to maintain the cans in their proper position in the runway, and to the same end I may employ a series of brushes 148, fixed upon the side bars 25 and 26, see Figs. 1, 2, 5 and 11. Said brushes project into the runway to a slight extent and incline toward the discharge end thereof. They act to prevent the cans from jumping forwardly and tipping over. They also prevent retrograde movement of the cans at the lower ends thereof, and tend to hold the bottoms of the cans in proper position after they are slightly advanced by the following devices:

Cans, owing to the lids or covers, are slightly wider or thicker through at the top than at the bottom, and consequently it is advantageous to provide means for advancing the cans at the lower ends thereof independent of any advancement of the cans through the runway by the bunter or pusher 27. To this end I mount a slide bar 149, beneath the runway, or between the rails 23 and 24, Figs. 2 and 5, said bar being pin-jointed to lever 31 and through which it receives a reciprocatory motion.

The bar throughout the major portion of its length is provided with a series of pivotally-mounted fingers or detents 150, the fingers being so counterweighted as to cause the upper ends thereof to project up into the runway in the path of the cans and to engage the lower flanged edge of the can, see Fig. 20. The parts are so proportioned and timed that it is only during the last part of the forward or outward movement of the bar 149 that the detents act upon the cans to advance the lower portions thereof.

The outer portion of the bar is notched at intervals in its upper side, said notches receiving the laterally-extending ends of pivoted detents 151, said ends being inclined or beveled, as at 152, for a purpose which will presently appear. Normally said ends stand above the bar 149 and act upon the cans the same as detents 150.

Extending laterally from the runway is a shelf or table 153, (see Fig. 1), onto which the cans are transferred in rows from the runway in any desired number, say from six to twelve at a time. The cans as they are advanced along the runway opposite the shelf 153 pass under a series of downwardly-inclined brushes 154, mounted in blocks or clamps 155, secured upon a horizontally-disposed rod 156, see Figs. 1, 2, 15 and 16. An arm or bracket 157, secured at one end to two or more of the clamps 155, supports said clamps and brushes, the other end of the arm being secured to a block 158. Said block is secured in place upon a fixed bracket 159 extending outwardly from table 1. A slide 160 is mounted in block 158 and carries at its outer end a push plate 161, adapted, when actuated, to transfer the can from the runway to the shelf or table 153. A link or pitman 162 is connected to slide 160, the opposite end of the link being pivotally connected to the upper end of a lever 163 fulcrumed at 164 to a fixed supporting bar 165, said bar being supported and held in place by a hanger 166 supported from bar 114, and by a rod or post 167 (Fig. 4) which extends outwardly from the main frame of the machine. Lever 163 has connected to it a second pitman, 168, the opposite end of the pitman being connected to the outer end of a crank 169, carried by a shaft 170, journaled in the supporting bar 165. Said shaft also has secured to it a block 171 having a laterally-projecting tooth or abutment 172. These parts are normally at rest and only come into operation when the runway is filled with cans and it becomes necessary or desirable to transfer them to the shelf or table 153. To effect their operation the following mechanism is employed: Wrist pin 125, before mentioned, is extended out beyond pitman 124, see Figs. 18 and 20, and a pawl 173 is mounted thereon, the pawl being urged toward tooth 172 by a coiled spring 174. Sprocket wheel 126 is constantly rotating and pawl 173 is carried around therewith, and to hold the pawl out of operation with tooth 172, and consequently to let the crank 169 and allied parts remain at rest, a disk 175 is located adjacent the pawl, and normally stands in line with the tail of the pawl, Figs. 17 and 18, and throws or rocks the pawl so as to carry the same out of locking relation with the tooth 172. When, however, the disk is moved to one side, Figs. 19 and 20, spring 174 rocks the pawl and causes it, as wheel 126 continues its rotation, to engage tooth 172, thereby actuating crank 169 and, through the connections above described, causing the push plate 161 to be moved from the position shown in Fig. 15 to that shown in Fig. 16, thereby transferring the can in the runway opposite the plate onto the table 153. Disk 175 is mounted on the inner end of a rod 176, guided in a post 177, extending up from bar 165, the rod being connected to the lower end of a lever 178, fulcrumed on a bracket 179, the upper end of the lever being curved inwardly over the runway and carrying a cross bar or plate 180 with which the end can advancing along the runway contacts. A spring 181 serves to draw the upper end of the lever inwardly. As will be readily understood the cans, when they contact with plate 180, will gradually force the upper end of lever 178 outwardly and as a consequence wiper disk 175 will be gradually moved away from the pawl, the parts being so timed that when the runway is filled or contains the desired number of cans in front of push plate 161, disk 175 will be carried clear of the pawl, which then engages tooth 172 and effects a movement of the push plate. A complete rotation of crank 169 will move the plate forward and rearward and as the cans are moved clear of plate 180 onto table 153 lever 178 will swing inwardly, thereby drawing wiper disk 175 into the path of the pawl 173 and consequently disengaging it from the tooth just as the crank completes its revolution.

It is thought that the operation of the machine will be clearly understood from the foregoing description and a recapitulation is not, therefore, given.

As above noted, the machine may be adapted for the application of sealing bands, labels or the like to various forms of packages, and has been found advantageous in the application of revenue stamps to tobacco tins or cans. The convexity of the narrow sides of the cans and also the rounding of the ends of the lid renders the operation of applying the stamps more difficult than where the package to be stamped has flat faces. Furthermore, the bead which is usually present on the can body just below the edge of the cover, also interferes to a greater or less extent with the placement of the stamp in a smooth manner. The machine constructed and operating as above set forth has overcome these difficulties, and the stamp is caused to adhere firmly and smoothly to the can. Ears or angular portions are inevitably produced or result from the bending or wrinkling of the stamp, or the surplus material thereof present at the rounded ends of the can-cover, as the stamp or label ends are bent over and carried down against the convex sides of the can or package, and this whether the stamp be positioned or placed by mechanical means or by hand. No means is specifically provided in the present machine for producing such ears or bending them down, the presser-plates 137 and 137' merely lying on top of the stamps and preventing the ears or wrinkled material, which is inevitably present, from projecting upwardly above the can-tops.

It is manifest that the machine may be modified in many of its details and yet fall within the scope and spirit of the invention and the broader or generic claims are to be so read and construed.

No claim is made herein to the generic invention of associated lid-closing and stamp-applying means, as that is claimed in my co-pending application Serial No. 92,485, filed on or about April 20, 1916.

Having thus described my invention, what I claim is:

1. In a machine for stamping a receptacle having a lid, the combination of means for placing a stamp over the lid; and means movable with said first-named means for initially forcing the lid to its closed position.

2. In a machine for applying stamps to a receptacle having a lid, the combination of pincer mechanism adapted to place a stamp upon the lid; and a roller movable with said pincer mechanism, adapted to contact with the lid and force the same to its closed position prior to placement of the stamp.

3. In a machine of the character specified, the combination of means for clamping and holding a can; a pincer mechanism adapted to place a stamp over the top of the can with the ends of the stamp protruding beyond the can; a presser adapted to press the stamp upon the can top; and guiding means for the stamp carried by said presser.

4. In a machine of the character specified, the combination of means for clamping and holding a can in position; a pincer mechanism adapted to draw a stamp across the can top with the ends of the stamp protruding beyond the sides of the can; a presser for the stamp; and a pair of guide fingers extending downwardly from the presser, said fingers straddling the stamp and serving to guide the loose end thereof as it is drawn across the can top.

5. In a machine of the character specified, the combination of mechanism adapted to draw a stamp across the top of a can; a presser adapted to press the stamp on the can top; and guiding means carried by the presser for guiding the stamp as it is positioned by the stamp-drawing mechanism.

6. In a machine of the character described, the combination of means for advancing cans step by step; can-clamping means adapted to hold a can while it is at rest; means for applying paste to one face of the stamp; means for placing a stamp upon the can thus held; and means for thereafter moistening the outer face of the stamp ends and carrying the ends into contact with the sides of the can.

7. In a machine for applying stamps to receptacles, the combination of means for holding the receptacles; means for placing a stamp in pasted contact with the receptacle; a brush wiping against the outer unpasted portion of the stamp and carrying the stamp into contact with the receptacle; and means for moistening said brush.

8. In a machine for applying stamps to receptacles, the combination of means for holding a receptacle; means for presenting a pasted stamp in proper relation thereto; means acting on the unpasted face of the stamp for wiping the stamp into contact with the receptacle; and means for moistening or dampening said wiping means and thereby moistening that portion of the stamp which is acted upon by the wiping means.

9. In a machine for applying stamps to receptacles; the combination of means for holding a receptacle; means for presenting a pasted stamp in proper position thereto; a brush acting on the unpasted face of the stamp for wiping the stamp against the receptacle; and a moistening element bearing against the brush.

10. In a machine for applying stamps to receptacles, the combination of means for holding a receptacle; stamp presenting means; a rotary brush for wiping the stamp against the receptacle; and a flexible moistening band bearing against the brush.

11. In a machine for applying stamps to receptacles, the combination of means for holding a receptacle; stamp presenting means; a rotary brush for wiping a stamp against the receptacle; a water reservoir; and a flexible, absorbent band bearing against the brush and extending into the reservoir.

12. In a machine for applying stamps to receptacles, the combination of means for holding a receptacle; stamp presenting means; a rotary brush for wiping the stamp against the receptacle; a water reservoir; a spring; and a spring-sustained band extending into the reservoir and bearing against the brush.

13. In a machine for applying stamps to receptacles, the combination of means for holding a receptacle; stamp presenting means; a brush; means for rotating the same; means for carrying the brush, while rotating, down and up in contact with the stamp; and means for moistening the brush.

14. In a machine for applying stamps to receptacles, the combination of means for holding a receptacle; stamp presenting means; a brush; means for rotating the same; means for swinging the brush, while rotating, down and up in contact with the stamp; and a spring-sustained moistening band in contact with the brush.

15. In a machine for applying stamps to receptacles, the combination of means for holding a receptacle; stamp presenting means; a rotatable brush; means for moving the same downwardly and upwardly in contact with the adjacent portion of the stamp; and means for rotating the brush, the peripheral speed of the brush exceeding that of the up-and-down motion thereof.

16. In a machine for applying stamps to receptacles, the combination of means for holding a receptacle; stamp presenting means; a brush adapted to press the stamp against the receptacle; means for bodily traversing the brush against the stamp; and means for rotating the brush at a speed in excess of that of the traversing movement.

17. In a machine for applying stamps to containers, the combination of a runway for holding the container; means for placing a stamp on the container; means located on opposite sides of the runway for pressing the body of the stamp adjacent each end of the top of the container against the top; and means movable down and up against the stamp ends to press the same against the container, the first-named means remaining in position until after the end-pressing means have performed their operation.

18. In a machine for applying stamps to containers, the combination of means for positioning and holding a container; means for placing a stamp upon the top of the container with the ends of the stamp extending beyond the same; means located to each side of the positioning and holding means for holding the stamp against the top at each end of the top; and a pair of brushes, one for each stamp end, adapted to wipe said ends against the body of the container.

19. In a machine for applying stamps to containers, the combination of a swinging frame; a presser plate carried thereby and adapted to press the body of the stamp against the container top; a second swinging frame; a rotatable brush carried thereby and adapted to carry the stamp end against the side of the container; means for swinging the brush-carrying frame; and means operated by the brush-frame for elevating the presser plate carrying frame.

20. In a machine for applying stamps to tin cans, the combination of a runway; means for feeding cans into the runway; means for applying stamps to the upper ends of the cans; means for advancing the cans step by step along the runway; and means acting on the lower portion of the cans to maintain the cans in proper position.

21. In a machine for applying stamps to tin cans, the combination of a runway; means for applying stamps to the can; means for advancing the stamped cans step by step along the runway; means acting on the lower portion of the cans to throw said lower portions forward; and yielding means bearing against the lower portion of the cans to prevent retrograde movement thereof.

22. In a machine for applying stamps to tin cans, the combination of a runway; means for applying stamps to the cans while in said runway; means for advancing the cans step by step along the runway; a bar located beneath the runway; a series of pivoted detents carried by the bar and adapted to engage the can bottoms; and means for reciprocating the bar.

23. In a machine for applying stamps to tin cans, the combination of a runway; means for advancing cans step by step along the runway; a bar located beneath the runway; a series of pivoted detents carried by the bar and adapted to engage the can bottoms; means for reciprocating said bar; and a series of brushes, arranged upon opposite sides of the runway, said brushes extending inwardly into the runway and in the direction of the feed of the cans.

24. In a machine for applying stamps to tin cans, the combination of a runway; means for advancing cans therethrough step by step; means acting on the lower portion of the cans to maintain the cans in vertical alinement; means for placing a stamp upon the top of each can with the ends thereof protruding beyond the top; presser plates bearing upon the stamp at each end of the can top; means for wiping the ends of the stamps down against the sides of the can while the plates are acting; and heaters associated with said plates.

25. In a machine for applying stamps to containers, the combination of a runway; means for advancing containers therethrough; a swinging frame located at one side of the runway; means for swinging the frame; a rotary brush carried by the frame; a second swinging frame; a stamp-presser plate carried thereby; means acting to constantly draw said second frame downwardly; and means interposed between said frames for causing the brush frame to lift or swing the presser plate frame when the former carries the brush out of operative position with relation to the stamp and container.

26. In a machine for applying stamps to containers, the combination of a runway; means for advancing containers therethrough; means for applying stamps to the containers; a table located to one side of the end of the runway; a push plate arranged upon the opposite side of the runway; normally inoperative means for moving said plate across the runway to effect a transfer of the stamped container in line with said plate onto the table; a push bar extending into the runway in line with the advancing containers; and means controlled by said bar for rendering the push plate operating means operative when a predetermined number of stamped containers are positioned in front of the pusher plate.

27. In a machine for applying stamps to containers, the combination of a runway; means for advancing containers therethrough; means located along the forward portion of the runway to apply stamps to the containers; a reciprocating bar located at the lower portion of the runway; a series of pivoted detents carried by the forward portion of the bar, adapted to contact with the lower portions of the containers; a second series of detents pivoted to the bar adjacent the outer end thereof, each of said detents being formed with a beveled arm overlying a notch formed in said bar; a plurality of brushes located above the runway at the outer end thereof and adapted to contact with the upper ends of the containers; a table located to one side of the runway at the outer end thereof; and means to transfer the stamped containers from beneath said brushes and onto the table.

28. In a machine for applying stamps to containers, the combination of a runway; means for advancing the containers therethrough step by step; means located adjacent the forward portion of the runway to apply stamps to the containers; a presser-plate adapted to contact with the stamps applied to the upper portion of the containers; and a series of depending fingers protruding from the lower face of the presser-plate and adapted to pass between the containers, to prevent the same from shifting.

29. In a machine for applying stamps to containers, the combination of a runway; means for advancing the containers therethrough; means located adjacent the forward portion of the runway to apply stamps to the containers; a pair of oppositely-arranged presser-plates adapted to contact with the upper portion of the containers and the stamps thereon; and a plurality of fingers extending from the lower side of each presser-plate and adapted to pass between the containers, to prevent the same from shifting.

30. In a machine for applying stamps to containers, the combination of a runway; means for advancing the containers therethrough; means located adjacent the forward portion of the runway to apply stamps to the containers; a pair of oppositely-arranged presser-plates; means for swinging said presser-plates downwardly and upwardly into and out of contact with said containers; and a plurality of fingers protruding from the lower face of each presser-plate, said fingers being rounded at their lower ends and adapted to pass between the containers, to prevent the same from shifting under pressure or impact applied by the presser-plate.

31. In a machine for stamping a receptacle having a lid, the combination of means for placing a stamp over the lid; and means carried by the first named means for initially forcing the lid to its closed position.

In testimony whereof I have signed my name to this specification.

GEORGE W. GWINN.